United States Patent
Bennett et al.

(10) Patent No.: US 9,325,233 B2
(45) Date of Patent: Apr. 26, 2016

(54) DC TO DC CONVERTER AND PWM CONTROLLER WITH ADAPTIVE COMPENSATION CIRCUIT

(71) Applicant: Texas Instruments Incorporated, Dallas, TX (US)

(72) Inventors: Paul Thomas Bennett, Phoenix, AZ (US); Robert Henry Bell, Prescott, AZ (US); Sang Yong Lee, Chandler, AZ (US); Robert Kenneth Oppen, Phoenix, AZ (US); Jiandong Jiang, Phoenix, AZ (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 111 days.

(21) Appl. No.: 14/320,747

(22) Filed: Jul. 1, 2014

(65) Prior Publication Data

US 2016/0006336 A1    Jan. 7, 2016

(51) Int. Cl.
*H02M 3/158*    (2006.01)
*H02M 1/00*    (2007.01)

(52) U.S. Cl.
CPC .............. *H02M 1/00* (2013.01); *H02M 3/158* (2013.01); *H02M 2001/0003* (2013.01)

(58) Field of Classification Search
CPC ............................... H02M 3/156; H02M 1/12
USPC ................. 323/285, 271, 222, 225, 268, 282; 327/156
See application file for complete search history.

(56) References Cited

U.S. PATENT DOCUMENTS

| | | | | |
|---|---|---|---|---|
| 8,581,562 B2 * | 11/2013 | Chen | ...................... | H02M 3/158 323/222 |
| 2011/0148381 A1 * | 6/2011 | Kwan | .................... | H02M 3/156 323/285 |
| 2012/0161728 A1 * | 6/2012 | Chen | .................... | H02M 3/1563 323/271 |
| 2013/0328534 A1 * | 12/2013 | Hsieh | ...................... | H02M 1/00 323/271 |

OTHER PUBLICATIONS

Lee, SW, "Practical Feedback Loop Analysis for Current-Mode Boost Converter", Texas Instruments Application Report, SLVA636, Mar. 2014, 12 pgs.
"Wide Input Synchronous Boost Controller with Disconnection Switch Control", Texas Instruments, LM5121/LM5121-Q1, SNVA963A, Sep. 2013, revised Sep. 2013, 43 pgs.

* cited by examiner

*Primary Examiner* — Matthew Nguyen
*Assistant Examiner* — Kyle J Moody
(74) *Attorney, Agent, or Firm* — William B. Kemplar; Frank D. Cimino (57) ABSTRACT

DC to DC converters and PWM controllers are presented in which a slope compensation ramp signal is provided for current control operation via a frequency adaptive compensation circuit with a phase locked loop that provides a control output signal having an amplitude generally proportional to the frequency of a clock signal, and a slope generator circuit generating the slope compensation ramp signal with an amplitude generally proportional to the control output signal amplitude.

20 Claims, 9 Drawing Sheets

DC TO DC CONVERTER AND PWM CONTROLLER WITH ADAPTIVE COMPENSATION CIRCUIT

FIELD OF THE INVENTION

The present disclosure relates to DC to DC converters and PWM controllers with frequency adaptive slope compensation circuitry.

BACKGROUND

DC to DC converters are switching power supplies which convert received input power by operation of one or more switching devices to provide a controlled DC output. Various forms of DC to DC converters have been developed, including buck converters which regulate the output voltage to a level generally lower than the input voltage, as well as boost converters which can provide an output voltage higher than the input voltage level. The converter switching devices are typically operated in closed loop fashion through pulse width modulation (PWM) for voltage mode control with the PWM duty cycle being adjusted according to an output voltage feedback signal. Current mode control techniques are sometimes used in which an inner current control loop and an outer voltage control loop are used. One type of current mode control involves fixed frequency peak current mode control with a fixed slope compensation ramp added to a sensed inductor current ramp to mitigate sub harmonic switching, where the current through a converter inductor is directly controlled and the output voltage is controlled indirectly by the current loop. Changing the switching frequency for different applications, however, requires adjustment in the compensation slope. Single and multi-phase peak current mode PWM regulators have been developed which can operate over a wide range of frequencies from several tens of kilohertz through gigahertz operation, and provide a dedicated pin for connection to an external resistor or other component to adjust the compensation slope. However, operation of the DC to DC converter is thus dependent upon the external component to provide a compensation slope corresponding to the operating frequency, and incorrect selection of external components can cause a mismatch between the actual operating frequency and the compensation slope. In addition, providing a dedicated integrated circuit pin for external compensation adjustment is costly in terms of circuit board area and component costs. Accordingly, a need remains for improved DC to DC converters and PWM controllers for simplified operation over a wide range of converter switching frequencies.

SUMMARY

DC to DC converters, PWM controllers and techniques are provided in which frequency adaptive slope compensation circuitry is used to facilitate current mode control over a wide range of switching frequencies. A controller is provided for controlling a DC to DC converter according to one or more aspects of the disclosure. The controller may be a single integrated circuit in certain embodiments, and includes a modulator circuit providing one or more switching control signals to operate at least one switching device to control a converter output voltage, as well as an error amplifier circuit providing an error signal based on comparison of a reference signal and a feedback signal. The controller further includes a summation circuit providing a compensated current sense signal based on summation of a current sense signal and a slope compensation ramp signal provided by a compensation circuit. The compensation circuit includes a phase locked loop (PLL) circuit and a slope generator circuit, with the PLL receiving a clock signal and providing a control output signal having an amplitude generally proportional to the frequency of the clock signal. The slope generator circuit receives the PLL control output signal and provides the slope compensation ramp signal to the summation circuit having a repeating ramp waveform with an amplitude varying at least partially according to the amplitude of the control output signal from the PLL. The compensation circuit thus avoids or mitigates the use of dedicated controller pins and external components for programming the compensation slope, thus providing self-adaptation for tailoring the slope compensation to a given operating frequency while conserving integrated circuit pins and circuit board space, and reducing circuit complexity and component costs, and allowing universal use of a PWM controller in a variety of different DC to DC converter applications.

DESCRIPTION OF THE VIEWS OF THE DRAWINGS

The following description and drawings set forth certain illustrative implementations of the disclosure in detail, which are indicative of several exemplary ways in which the various principles of the disclosure may be carried out. The illustrated examples, however, are not exhaustive of the many possible embodiments of the disclosure. Other objects, advantages and novel features of the disclosure will be set forth in the following detailed description when considered in conjunction with the drawings, in which.

DETAILED DESCRIPTION

One or more embodiments or implementations are hereinafter described in conjunction with the drawings, wherein like reference numerals are used to refer to like elements throughout, and wherein the various features are not necessarily drawn to scale. The present disclosure provides DC to DC converters and controllers therefor, as well as integrated circuits and control methods, which find utility in a variety of switching power supply applications, including without limitation DC to DC converters of any suitable form such as boost converters, buck converters, buck/boost converters, CUK converters, etc. The disclosed concepts, moreover, may be employed in connection with single phase or multiphase DC to DC converter configurations, wherein multiple converter stages can be connected in parallel with one another and operated by phase shifted synchronized clock signals, with the individual stages providing current mode control using frequency adaptive slope generation circuitry as described herein.

Figure 1:
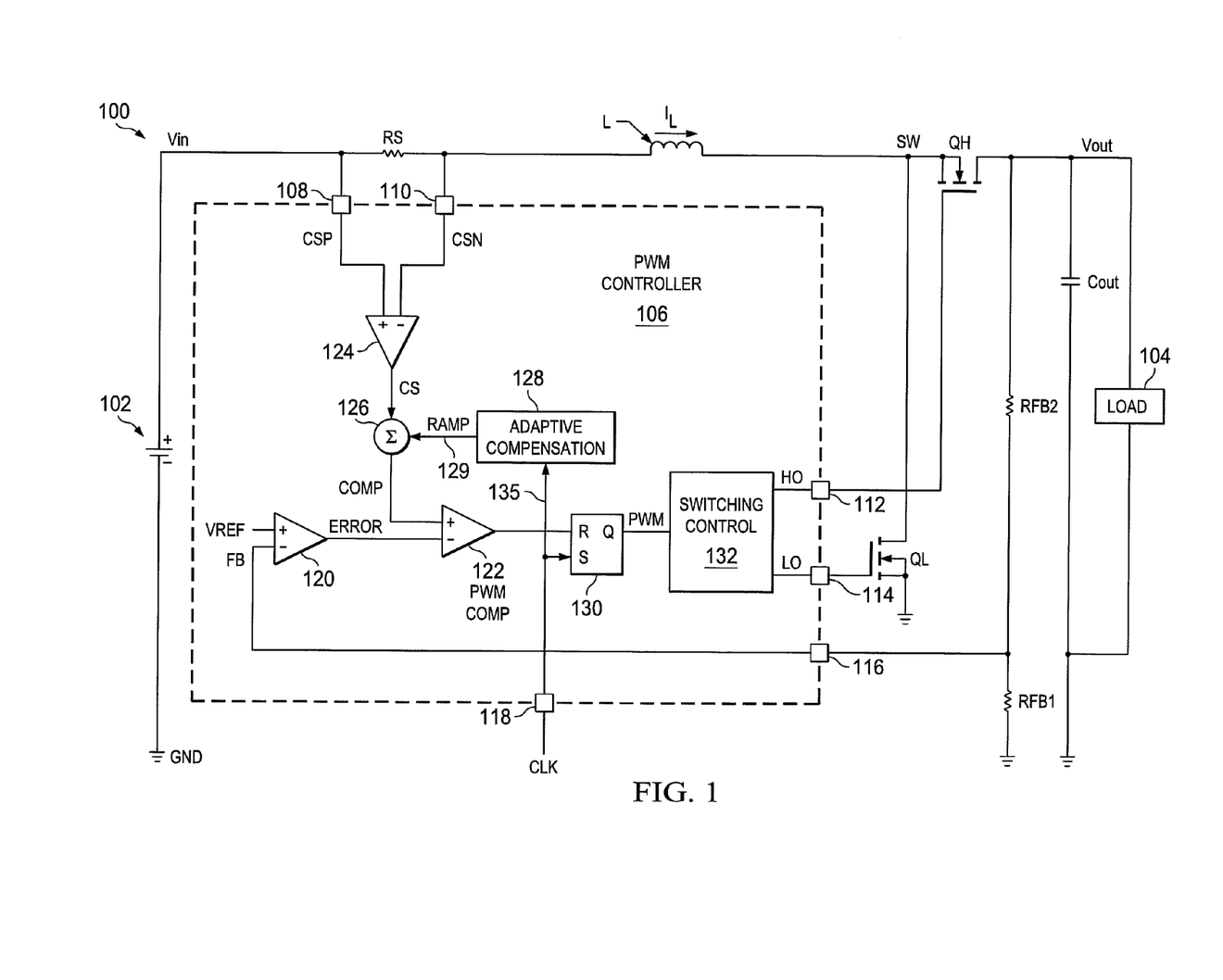
FIG. 1 is a schematic diagram illustrating a boost DC to DC converter with a PWM controller including an adaptive compensation circuit providing a compensation ramp signal for current mode control with a frequency dependent ramp amplitude according to one or more aspects of the present disclosure.

FIG. 1 illustrates a boost type DC to DC converter 100 in which one or more concepts of the present disclosure may be implemented. The converter 100 receives an input voltage Vin from an input supply 102 and provides a controlled output voltage Vout to a load 104, with a PWM controller 106 regulating the output voltage Vout in closed loop fashion by provision of one or more pulse width modulated switching control signals HO and LO to selectively activate and deactivate high and low driver switches QH and QL, respectively. The PWM controller 106 in certain embodiments is implemented as a single integrated circuit (IC) having current sense positive and negative terminals 108 and 110 to receive positive and negative current sense signals CSP and CSN, respectively, for current mode control. The IC 106 includes switching control output terminals 112 and 114 for providing the switching control signals HO and LO to the control terminals of the high and low side driver switches QH and QL. In addition, the illustrated controller IC 106 includes a feedback terminal 116 for receiving an output voltage feedback signal FB representing the output voltage Vout of the DC to DC converter 100 and a clock signal terminal 118 for receiving a clock signal CLK, where other terminals may be provided in PWM controller integrated circuit embodiments employing various concepts of the present disclosure.

In the boost converter configuration of FIG. 1, the driver switches QH and QL are connected in series with one another between an output terminal of the converter 100 and a constant voltage node such as a circuit ground GND, and are joined at a switching node SW to form a switching circuit. While the illustrated example includes two N-channel MOSFET switches QH and QL, other embodiments are possible in which a single switching device (e.g., QL) can be coupled with the switching node SW, with the high side device QH being replaced by a diode rectifier. In addition, one or more P-channel MOSFET switches can be used, or combinations of N-channel and P-channel switches can be used to form a boost converter topology. Furthermore, different types of switches can be used, including without limitation MOSFETs, bipolar switches, IGBTs, etc., or combinations thereof in various embodiments, with the PWM controller 106 providing suitable switching control signals to operate the converter switch or switches.

An inductor L is coupled between the input supply 102 and the switching node SW to conduct a current $I_L$ as shown in FIG. 1. An external sense resistor RS is connected in series between the input source 102 and the inductor L, with opposite sides of the sense resistor RS coupled to the current sense terminals 108 and 110 to provide a voltage signal CSP, CSN to the PWM controller 106 representing the inductor current $I_L$. An output capacitance Cout may be connected between the output terminal and the circuit ground in parallel with the load 104 as shown, and a feedback circuit is provided by resistors RFB1 and RFB2 connected in series with one another between the output terminal and the circuit ground to form a resistive divider, with a center node connecting the feedback resistors to the feedback terminal 116 to provide the output voltage feedback signal FB to the PWM controller IC 106. While the embodiment of FIG. 1 provides a boost converter 100, other DC to DC converters can be implemented using frequency adaptive compensation in accordance with one or more concepts of the present disclosure, including without limitation an example buck converter 200 illustrated and described below in connection with FIG. 7.

The PWM controller 106 in FIG. 1 includes a modulator circuit formed by an error amplifier circuit 120, a PWM comparator 122, a PWM latch 130 and a switching control circuit 132. The modulator circuit provides pulse width modulated switching control signals HO and LO at least partially according to the clock signal CLK for selective activation and deactivation of the switches QH and QL in a plurality of converter switching cycles in order to control the converter output voltage Vout. A variety of different modulator circuits can be employed, using fixed frequency or variable frequency PWM techniques, with the modulator in certain embodiments implementing duty cycle control to regulate the output voltage Vout and to control the peak inductor current $I_L$ based on the output voltage feedback signal FB from the feedback terminal 116 and the current sense information received at the terminals 108 and 110. A first input (e.g., non-inverting "+" input) of the error amplifier circuit 120 receives a setpoint or reference signal VREF representing a desired output voltage for the DC to DC converter 100. The setpoint reference may be internally generated in the PWM controller IC 106 or may be received from an external source in certain embodiments. The error amp 120 has a second input (e.g., inverting or "−" input) coupled to receive the feedback signal FB representing the converter output voltage Vout, and an error amplifier output provides an error signal ERROR based on a comparison of the reference signal VREF with the feedback signal FB. The error amplifier circuit 120 may include one or more additional circuit components for feedback and input connections and/or to set a circuit gain (not shown) in order to provide an error output signal ERROR to the PWM comparator 122 having an a amplitude generally proportional to the difference between the reference VREF and the feedback signal FB.

A current sense amplifier 124 senses the positive and negative input voltage signals CSP and CSN representing the voltages at the terminals of the sense resistor RS via the terminals 108 and 110, and provides a current sense signal CS representing the inductor current $I_L$. One or more additional circuit components (not shown) may be provided in various embodiments of the current sense amplifier circuit 124 for providing a voltage or current signal CS having a amplitude generally proportional to inductor current $I_L$. A summation circuit 126 receives the current sense signal CS and provides a compensated current sense signal output COMP based on a summation of the current sense signal CS and a slope compensation ramp signal RAMP from an adaptive compensation circuit 128. The compensated current sense signal output COMP is provided as a second input to the PWM comparator 122, which provides a comparator output to a reset ("R") input of the PWM latch 130, which is an S-R flip flop in one embodiment. The set or "S" input of the latch 130 is controlled by the clock input CLK for starting or ending individual switching cycles of the DC to DC converter 100. In certain embodiments, moreover, a phase shifting circuit (e.g., circuit 119 in FIG. 8 below) can be provided to shift the received clock signal phase (e.g., by 1/2, 1/3, 1/4, . . . , 1/N or other fraction of a cycle) for synchronized operation of an integer number N of PWM controllers 106 providing PWM switching control signals for N parallel connected converter stages 100 in a multi-phase converter system (not shown). The PWM latch 130 provides a pulse width modulation signal PWM to a switching control circuit 132 to control the converter output voltage Vout. The switching control circuit 132 can be any suitable logic and signal driver circuitry to provide complementary pulse width modulated high and low side control signals HO and LO suitable for activating and deactivating the converter switches QH and QL, respectively, in alternating fashion during a series of converter switching cycles.

Figure 2:
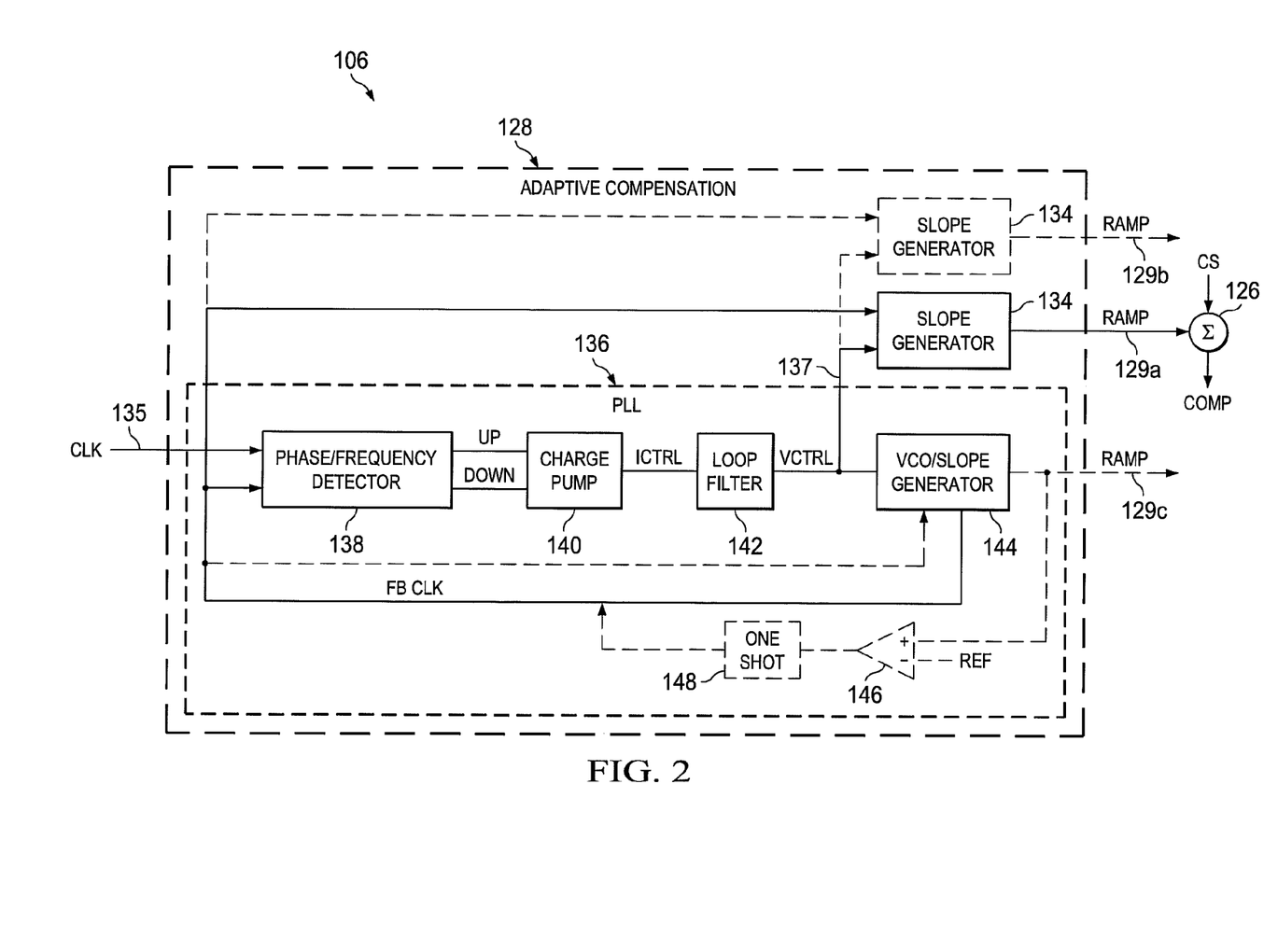
FIG. 2 is a schematic diagram illustrating an embodiment of the adaptive slope generator in FIG. 1 including a phase locked loop and one or more slope generator circuits.

Referring also to FIG. 2, the compensation circuit 128 provides the slope compensation ramp signal RAMP with an amplitude generally proportional to the frequency of the clock signal CLK for current control operation of the DC to DC converter 100. The compensation circuit 128, moreover, is adaptive or self-adjusting, and thus advantageously mitigates or eliminates the need for external components to set a compensation ramp signal commensurate with an operating frequency. This feature, in turn, facilitates programmatic or external adjustment of the operating frequency of the clock signal CLK without reconfiguration or component replacement in the converter 100.

The illustrated compensation circuit 128 includes a phase locked loop PLL 136 with a clock input 135 receiving the clock signal CLK. The PLL 136 provides a control output as a current signal ICTRL or a voltage signal VCTRL with an amplitude generally proportional to the frequency of the clock signal CLK. In the example of FIG. 2, the control output signal VCTRL is provided as an input to one or more slope generator circuits 134, 144. At least one of the slope generator circuits 134, 144 provides the slope compensation ramp signal RAMP at the slope generator output 129 as a repeating ramp waveform signal with an amplitude varying at least partially according to the amplitude of the control output signal VCTRL, ICTRL from the PLL 136. In this manner, the compensation circuit 128 is frequency adaptive, and the signal RAMP is provided with appropriate peak amplitude to the summation circuit 126 for slope compensating the current sense signal CS over a wide range of operating frequencies of the DC to DC converter 100, without requiring connection of external ramp adjustment components to a dedicated pin of the PWM controller IC 106.

Figure 3:
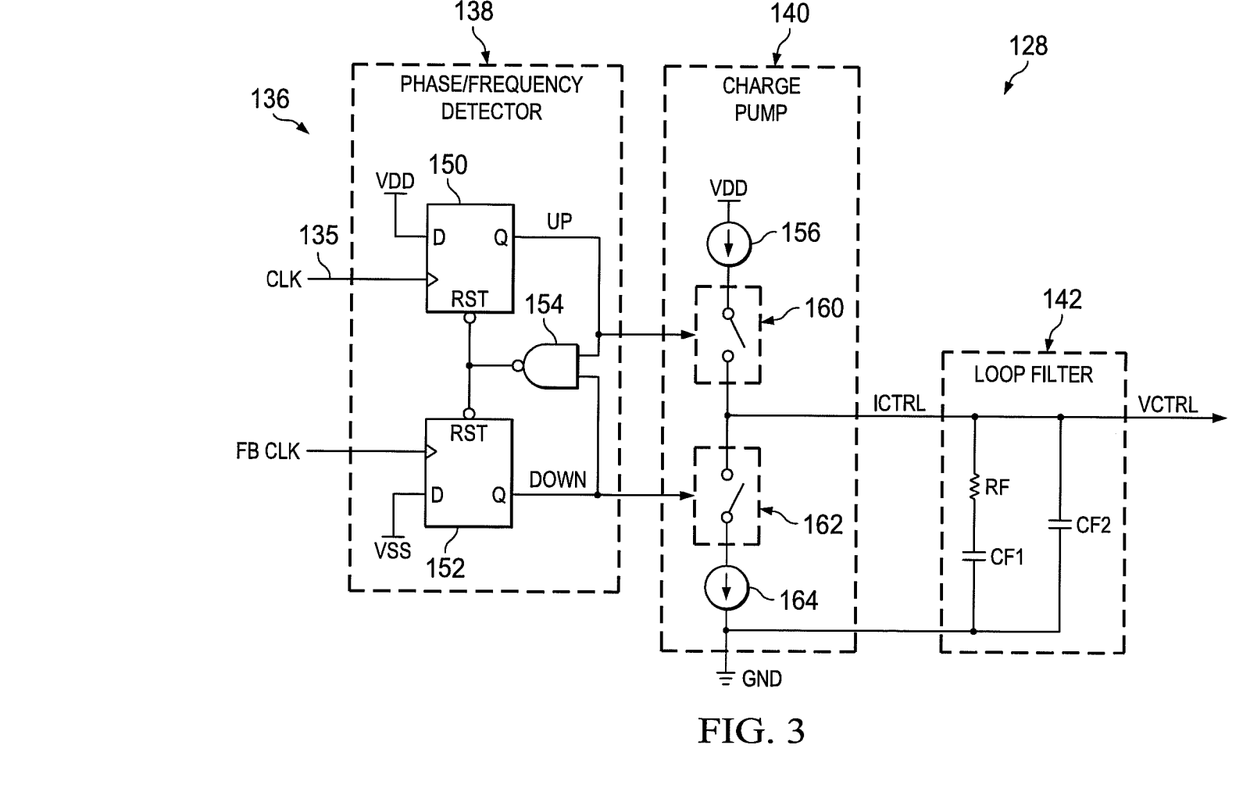
FIG. 3 is a schematic diagram illustrating further details of an embodiment of the phase locked loop in the adaptive slope generator circuit of FIG. 2.

Referring also to FIG. 3, a number of different PLL circuit configurations can be employed in various embodiments. The PLL 136 of FIG. 3 includes a phase frequency detector (PFD) 138 with a first input 135 receiving the clock signal CLK and a second input receiving a feedback clock signal FB CLK. The PFD 138 in this case includes first and second D flip flops 150 and 152, respectively, receiving the first and second clock input signals CLK and FB CLK at clock inputs, with the data or "D" input of the upper flip flop 150 being connected to a positive supply voltage VDD and the "D" input of the lower flip flop 152 being connected to a second supply node VSS. The outputs Q of the first and second flip flops 150 and 152 respectively provide UP and DOWN signals according to a phase comparison of the clock signal CLK with the feedback clock signal FB CLK. The UP and DOWN signals from the PFD 138 are provided as control inputs to a charge pump circuit 140 and to a NAND gate 154 driving reset ("RST") inputs of the flip flops 150 and 152.

The charge pump 140 provides an output current signal ICTRL accordingly, and a loop filter circuit 142 provides the control output voltage signal VCTRL at least partially according to the charge pump output current signal ICTRL. The charge pump 140 in FIG. 3 includes a first current source 156 coupled between the positive voltage VDD and a first charge pump switching circuit 160, and the first switching circuit 160 is connected between the current source circuit 156 and a control output terminal (labeled ICTRL in FIG. 3). A second switching circuit 162 is connected between the control output and a second current source 164, which in turn is coupled to a circuit ground. A low pass loop filter circuit 142 is optionally provided at the output of the charge pump 140, in one example including a capacitor CF2 connected between the control output terminal and the circuit ground GND, with a resistor RF coupled in series with a second filter capacitor CF1 in parallel with CF2. The charge pump 140 provides the control output signal according to the received up and down input signals by selective operation of the switch circuits 160 and 162 to connect the corresponding current sources 156 and 164 to the output terminal. By this operation, the control voltage VCTRL at the output of the loop circuit 142 is selectively increased, decreased, or maintained according to the relationship of the corresponding reference and feedback clock signals associated with the selected up and down signal source.

As best seen in FIG. 2, one implementation of the PLL circuit includes a voltage controlled oscillator (VCO) 144 providing the feedback clock signal FB CLK to the input of the PFD 138 to create a closed loop by which the charge pump 140 is adjusted up or down according to the relative phases of the input clock signal CLK and the feedback clock signal FB CLK. This, in turn, provides the control signal VCTRL (and ICTRL) having an amplitude corresponding to the input clock frequency. The circuit 144 in one implementation includes slope generation circuitry (e.g., as described below in connection with FIG. 4) to provide a RAMP signal 129c (shown in dashed line in FIG. 2) to the summation circuit 126 for slope compensation. In this case, the PLL circuit 136 may further include a comparator 146 comparing the RAMP signal 129c to a reference REF, with the output of the comparator 146 providing an input signal to a one shot circuit 148 to generate the feedback clock signal FB CLK. In another possible embodiment, multiple slope generator circuits 134 are included in the compensation circuit 128 to generate corresponding ramp output signals RAMP 129a and 129b as shown in FIG. 2. In certain embodiments, one of such multiple ramp signals may be programmatically provided to the summation circuit 126, such as through a programmable register of the controller IC 106, for instance, allowing selection of linear or non-linear ramp compensation.

Figure 4:
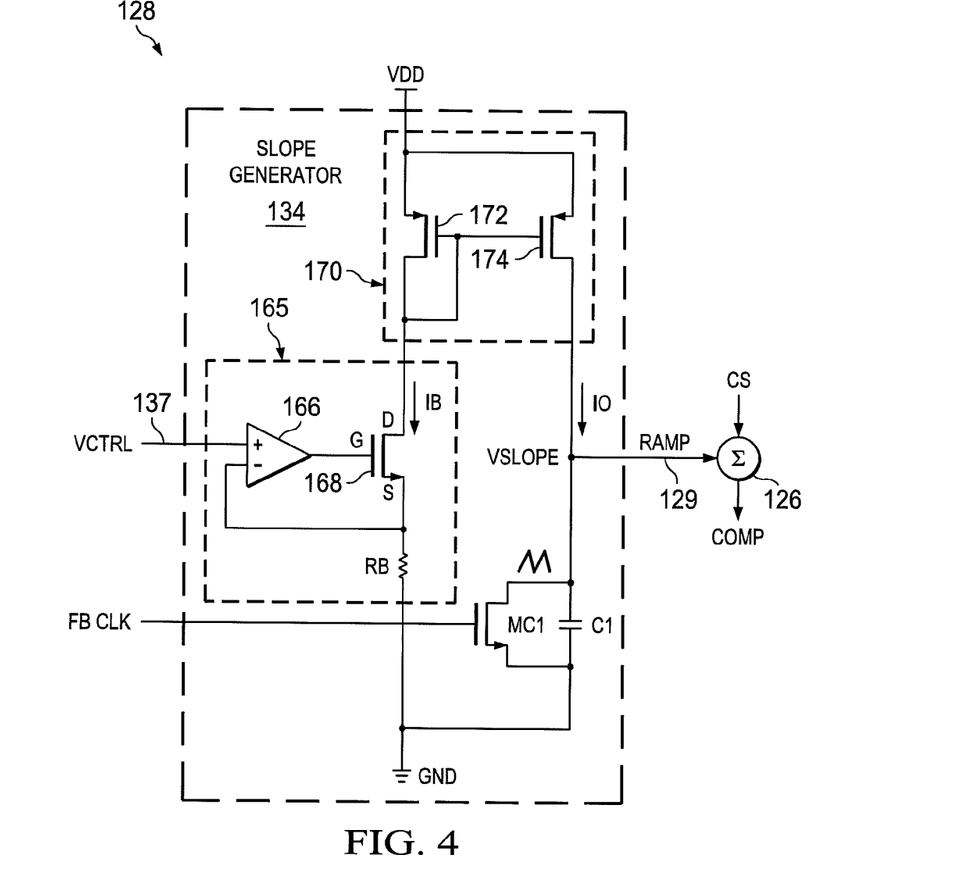
FIG. 4 is a schematic diagram illustrating a slope generator circuit embodiment providing a slope compensation ramp voltage signal.

FIG. 4 illustrates one embodiment of the slope generator circuit 134, which includes a current source circuit 165 coupled to receive the control output signal VCTRL at an input 137, as well as a current mirror circuit 170 and a ramp circuit formed by a transistor MC1 and a capacitance C1. The current source circuit 165 in this embodiment includes an op amp 166 with a non-inverting input receiving the control output signal VCTRL, and an NMOS transistor 168 with a drain terminal D coupled with the current mirror circuit 170, a source terminal S coupled with the inverting input of the op amp 166, and a gate terminal G coupled to the op amp output. The current source circuit 165 further includes a resistor RB coupled between the transistor 168 and the circuit ground GND. In operation, the current source circuit 165 provides a bias current signal IB with an amplitude generally proportional to the control output signal VCTRL, where the value of the bias current IB is set at least partially according to the control output signal VCTRL and the resistance between the source of the transistor 168 and GND.

The current mirror circuit 170 includes a first PMOS transistor 172 coupled between the positive supply node VDD and the current source circuit 164, as well as a second PMOS transistor 142 providing a mirror output current signal IO generally proportional to the bias current signal IB. Any suitable current source ratio can be used, such as 1:1 with the output current IO generally equaling the bias current IB in one embodiment. The ramp circuit capacitance C1 has a first terminal coupled to receive the mirror output current signal IO, and a second terminal coupled to a constant voltage node (e.g., GND), and the NMOS transistor MC1 is coupled in parallel with the capacitance C1. The transistor MC1 is operative as a switch according to a reset signal, the feedback clock signal FB CLK in one example, to selectively discharge the ramp circuit capacitance C1 at a beginning or end of individual converter switching cycles. In other possible embodiments, the input clock signal CLK can be used as the reset signal to drive the gate of MC1, or another reset signal can be used which is derived from one of the CLK or FB CLK signals. The node 129 provides a slope generator output as a voltage signal RAMP corresponding to the voltage across C1, with the periodic resetting via the transistor MC1 providing a repeating ramp waveform RAMP having an amplitude varying at least partially according to the amplitude of the control output signal VCTRL.

In the embodiment of FIG. 4, the control output signal VCTRL sets the gain of the current source circuit 165 by providing the reference input to the op amp 166. In this example, moreover, the bias resistor RB can be a fixed value, with the levels of the bias and output currents IB and IO being determined according to the amplitude of the VCTRL signal. Other embodiments are possible in which the input control signal is a current signal (e.g., ICTRL from the PLL 136) with suitable current source and/or current mirror circuitry to provide a RAMP output signal having a peak amplitude set according to the amplitude of the ICTRL signal. As seen in FIG. 4, moreover, the slope generator circuit 134 provides the slope compensation ramp signal RAMP having a linear ramp waveform, in this case due to the linear voltage rise across C1 based on a generally constant output charging current IO from the current mirror circuit 170.

Figure 5:
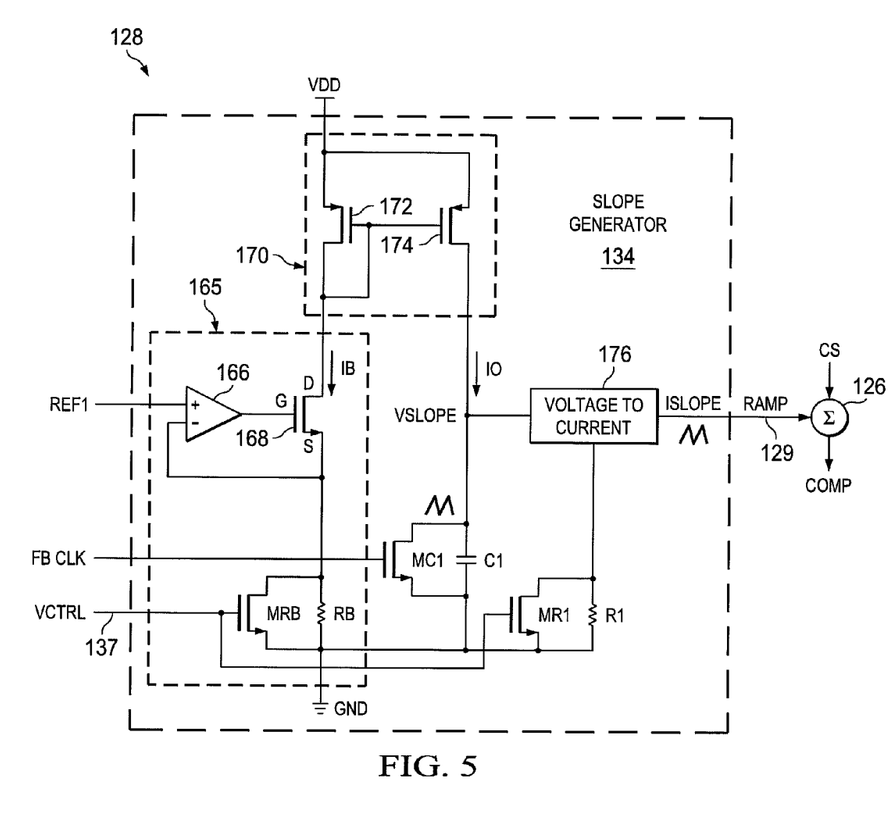
FIG. 5 is a schematic diagram illustrating another slope generator circuit embodiment providing a slope compensation ramp current signal.

FIG. 5 shows another slope generator circuit embodiment providing a slope compensation ramp current signal ISLOPE via a voltage to current circuit 176 coupled to receive the VSLOPE voltage signal from the upper terminal of the ramp circuit capacitance C1, where the circuit 176 provides the RAMP signal at the slope generator output 129 in the form of a slope current signal ISLOPE according to the voltage across the ramp circuit capacitance C1. A compensation signal RAMP in the form of a current waveform may be advantageously employed in embodiments in which the summation circuit 126 is a summing node in the PWM controller IC 106 receiving the current sense signal CS as a current for summation with the RAMP signal current. Any suitable transconductance amplifier or other voltage to current conversion circuitry 176 can be used, with the illustrated example including the resistor R1 connected between the circuit 176 and the circuit ground GND, with a gain of the voltage to current circuitry 176 being set according to the resistance R1.

In the embodiment of FIG. 5, moreover, the peak value of the RAMP compensation signal is set according to the amplitude of the VCTRL signal. Unlike the embodiment of FIG. 4, however, the current source amplifier 166 is provided with a fixed reference voltage REF1 at the non-inverting input, and the VCTRL signal sets the gain of the current source 165 via an adjustment transistor MRB connected in parallel with the bias resistor RB. Also, the gain of the voltage to current circuit 176 is adjusted according to the VCTRL signal by a gain adjustment transistor MR1 connected across the resistor R1 as shown. In this configuration, increases in the amplitude of the control output signal VCTRL from the PLL 136 (e.g., for increasing frequency of the clock signal CLK) will decrease the drain-source impedance of the transistor MRB, thereby decreasing the overall impedance between the source of the current source transistor 168 and the circuit ground GND. This increases the bias current IB and hence the output current IO, and increases the amplitude of the VSLOPE signal provided to the voltage to current circuit 176. In addition, increasing the amplitude of the VCTRL signal decreases the drain-source impedance of MR1, thereby decreasing the resistance between the voltage to current circuit 176 and GND and increasing the gain of the voltage to current circuit 176. In certain embodiments, this substantially reduces the required variation in the slope control adjustment by a factor proportional to the square of the voltage since the transconductance of MR2 is proportional to $K*(Vgs-Vt)^2$. The control voltage VCTRL is automatically adjusted by the PLL to achieve the desired ramp height in the RAMP signal output 129 by comparing its value (e.g., comparator 146 in FIG. 2 receiving the ramp signal 129c) at the end of one cycle of the feedback clock FB CLK to the voltage set by its input voltage REF. Conversely, decreasing the amplitude of the control output signal from the PLL 136 (e.g., for decreasing clock signal frequency) decreases the peak amplitude of the RAMP signal provided by the slope generator circuit 134. In this manner, the amplitude of the control output signal VCTRL (e.g., or ICTRL) controls a gain of the current source circuit 165, and the gain of the voltage to current circuit 176, thereby controlling the peak amplitude of the RAMP signal provided by the adaptive compensation circuit 128 for slope compensation in the PWM controller 106.

Figure 6:
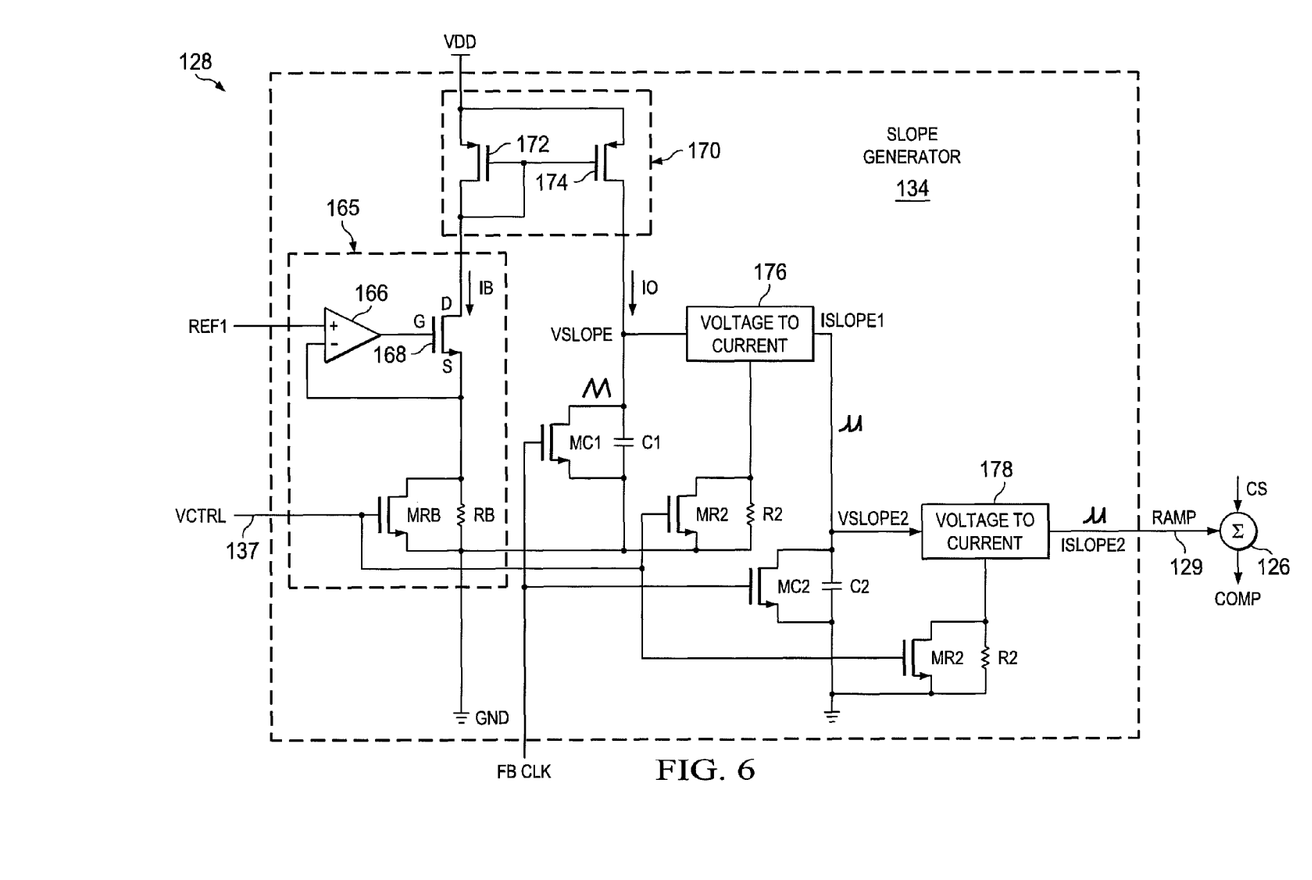
FIG. 6 is a schematic diagram illustrating another adaptive slope generator embodiment providing a non-linear compensation ramp current signal.

FIG. 6 illustrates another non-limiting embodiment of an adaptive compensation circuit 128, in this case providing a non-linear slope compensation ramp signal RAMP as a current signal ISLOPE2 according to the voltage across the second ramp circuit capacitance C2. As with the example of FIG. 5, the current source op amp 166 receives a fixed reference signal REF1, with the control output signal VCTRL from the PLL 136 controlling the gain of the current source circuit 165 via the transistor MRB. Also, the amplitude of VCTRL controls the amplitude of a first voltage to current circuit 176 via transistor MR2 as generally described above. In the embodiment of FIG. 6, moreover, the voltage to current circuit 176 provides a first slope current signal ISLOPE1 according to the voltage across the ramp circuit capacitance C1, and a second ramp circuit is provided with a second ramp circuit capacitance C2 and a second ramp control transistor MC2. The second ramp circuit capacitance C2 thus receives a ramped current from the first voltage to current circuit 176 and accordingly the voltage across the capacitance C2 provides a non-linear ramp voltage to a second voltage to current circuit 178 as shown in FIG. 6. The transistor MC2 is coupled across C2, and operates according to the reset signal (e.g., FB CLK) to discharge the capacitor C2 in each converter switching cycle. This provides a non-linear ramp voltage VSLOPE2 as an input to the second voltage to current circuit 178.

The voltage to current circuit 178, in turn, provides a non-linear current output signal ISLOPE2 as the ramp signal RAMP at the output 129 for summation with the current sense signal CS at the summation circuit 126. The voltage to current circuit 178, moreover, has a gain set by the resistance R2, where the gain of the second voltage to current circuit 178 in the illustrated embodiment is also set by the control output signal VCTRL which drives the gate of an NMOS gain control transistor MR2. In this manner, the RAMP signal is provided at the slope generator output 129 having a non-linear profile, thereby facilitating operation over a significantly wide range of DC to DC converter operating frequencies. Other embodiments are possible, for example, in which the voltage to current circuit 178 and the associated gain control components R2 and MR2 are omitted, with the summation circuit 126 receiving the RAMP signal as the voltage signal VSLOPE2 for summation with a voltage signal CS representing the sensed current.

Figure 7:
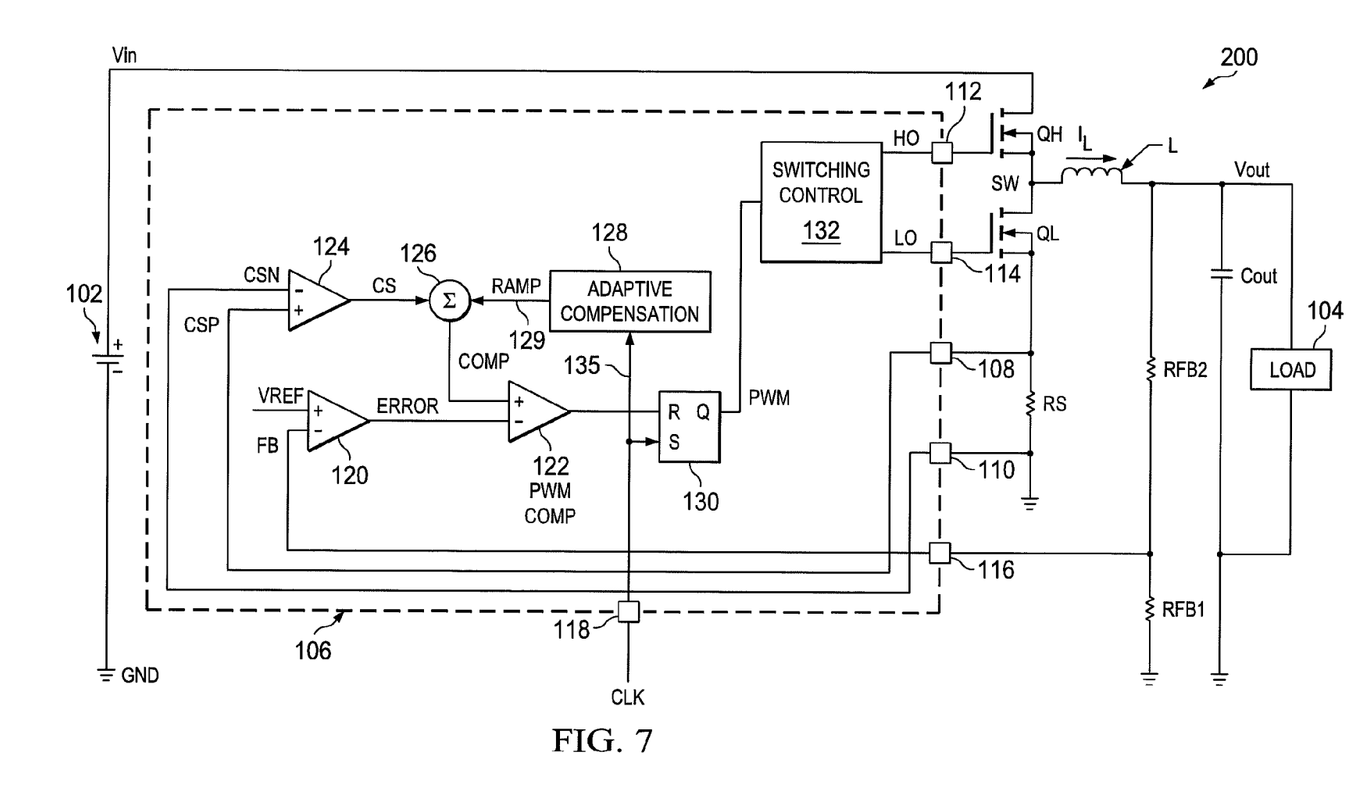
FIG. 7 is a schematic diagram illustrating a buck DC to DC converter with a PWM controller including an adaptive compensation circuit according to one or more aspects of the present disclosure.

Referring now to FIG. 7, as previously mentioned, the adaptive compensation circuitry 178 and the various associated aspects of the present disclosure may be implemented in a variety of forms and types of DC to DC converters or switching power supplies generally. FIG. 7 illustrates a buck DC to DC converter 200 with a PWM controller IC 106 including an adaptive compensation circuit 128 generally as described above. Unlike the boost converter 100 of FIG. 1, the buck type DC to DC converter 200 provides a first transistor QH coupled between the converter output node and the switching node SW, and a low side or second transistor QL coupled between the switching node SW and a constant voltage node (e.g., GND), with the output voltage feedback circuit resistors RFB1 and RFB2 connected in series with one another between the converter output node and ground to provide the feedback signal FB to the PWM controller pin 116 as shown. In the buck converter case of FIG. 7, moreover, the inductor L is coupled between the converter output node and the switching node SW, with a current sense resistor RS connected between the low side driver switch QL and ground. Other current sensing configurations can be used to provide a current sense signal CS via the amplifier 124 representing the current $I_L$ flowing in the inductor L, for example, using one or more RC circuits connected across the inductor L to provide current sense positive and negative (CSP and CSN) signals as inputs to the current sense amplifier 124. The modulator circuitry 120, 122, 130 and 132 is operative generally as described above to provide pulse width modulated switching control signals HO and LO to selectively activate and deactivate the converter switches QH and QL in complementary fashion to control the converter output voltage Vout, wherein the buck converter is particularly applicable where the input voltage Vin is greater than the desired output voltage Vout.

Figure 8:
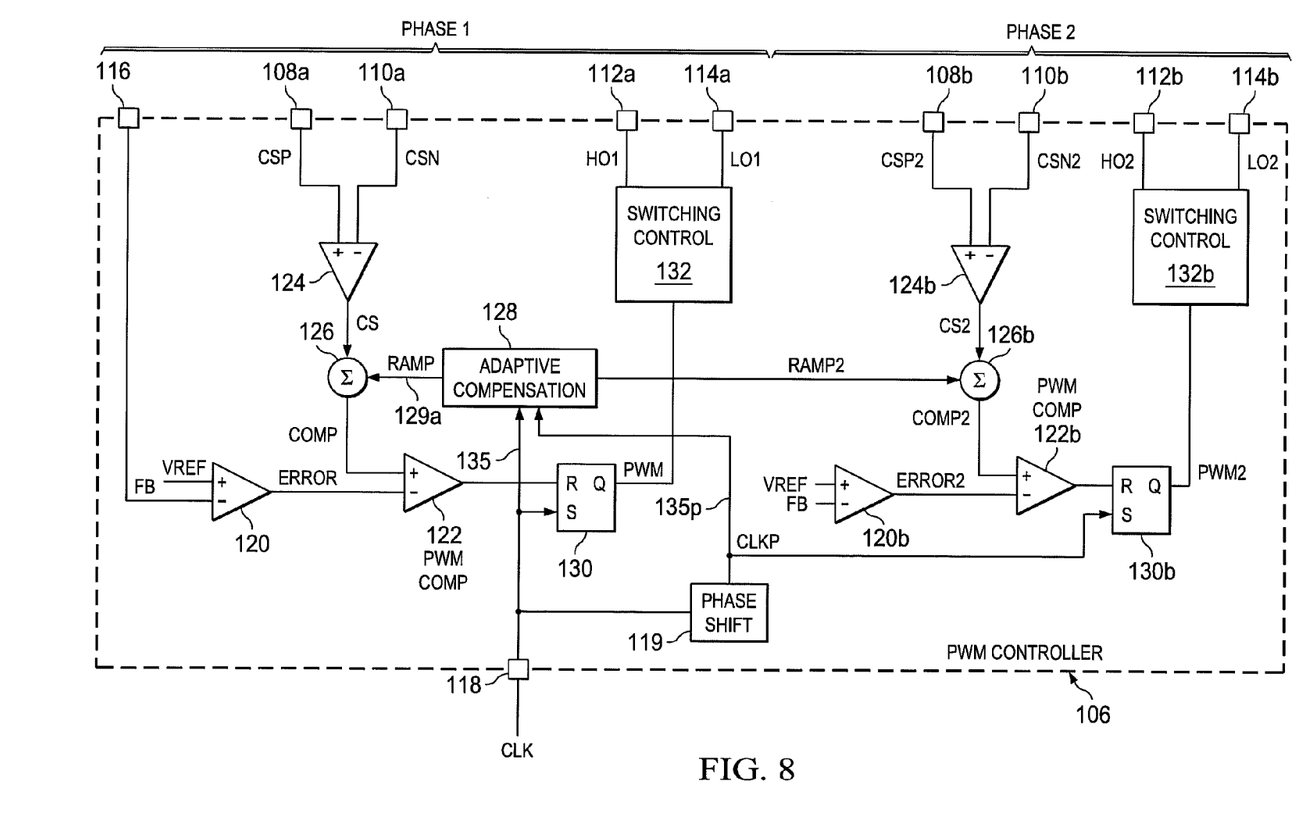
FIG. 8 is a schematic diagram illustrating a PWM controller for a multi-phase DC to DC converter with an adaptive compensation circuit providing phase shifted first and second compensation ramp signals for current mode control with frequency dependent ramp amplitudes.
Figure 9:
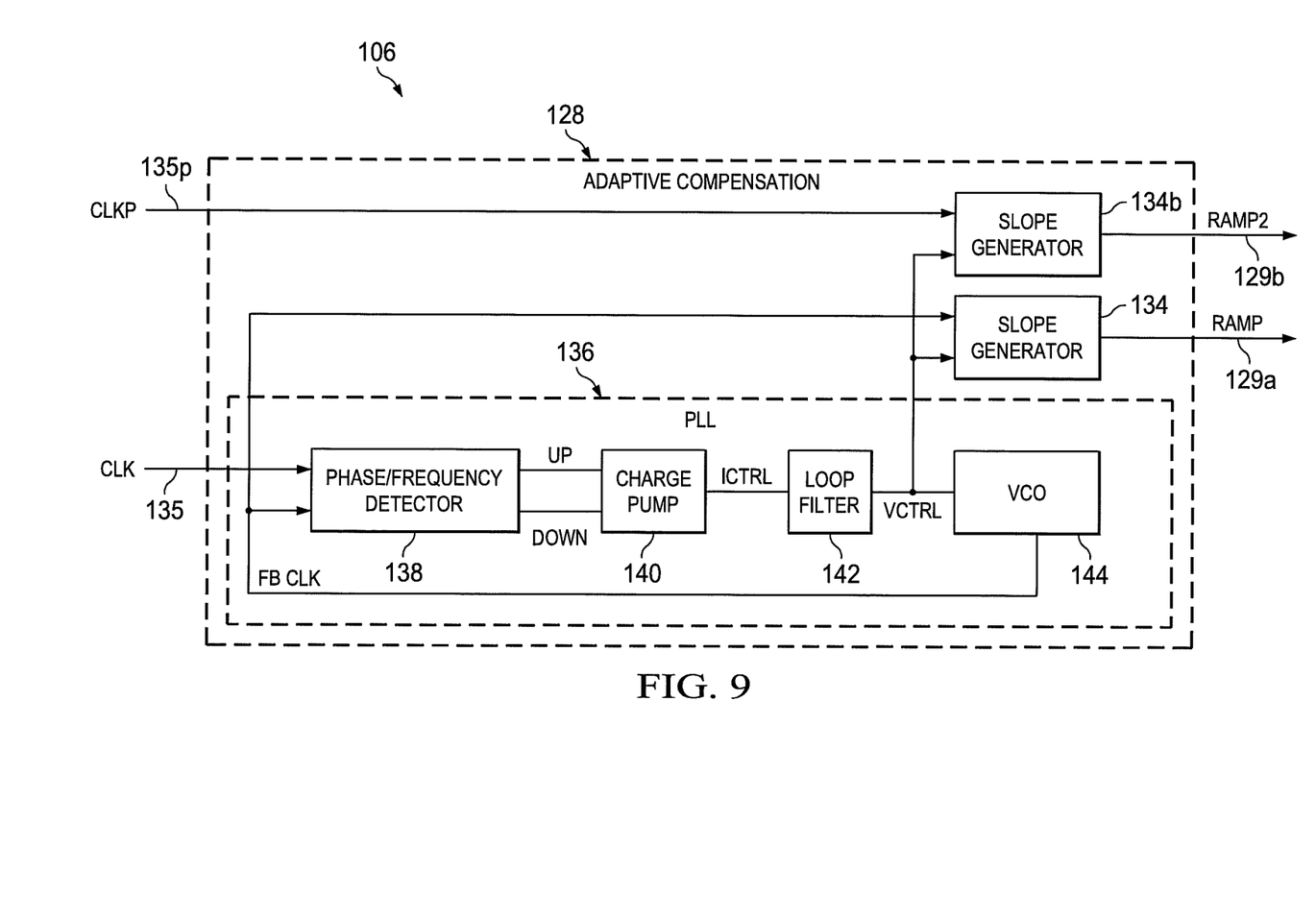
FIG. 9 is a schematic diagram illustrating an embodiment of the adaptive slope generator in FIG. 8 including a phase locked loop and two slope generator circuits providing phase shifted ramp signals based on phase shifted clock inputs and on a shared control signal from the phase locked loop.

Referring now to FIGS. 8 and 9, the concepts of the present disclosure can be used in multi-phase converter systems having two or more converter stages with outputs connected together to drive a single load. FIG. 8 shows a PWM controller embodiment 106 with an adaptive compensation circuit 128 providing phase shifted first and second compensation ramp signals RAMP 129a and RAMP2 129b at non-zero phase relationship to one another for current mode control with a frequency dependent ramp amplitude for providing first and second sets of switching control signals for first and second converter phases (PHASE 1 and PHASE 2). The controller 106 in this case includes a first modulator circuit 120, 122, 130, 132 generally as described above for providing a first set of high and low driver outputs HO1 and LO1 for current mode control according to sensed current from a first set of current sense terminals 108a and 110a and according to output voltage feedback received that a feedback terminal 116.

In addition, the controller 106 in FIG. 8 includes a phase shift circuit 119 receiving the clock signal CLK from an internal source or via the terminal 118 as shown, where the phase shift circuit 119 provides a phase shifted second clock signal CLKP along line 135p for use by the adaptive compensation circuit 128 and four timing control of a second modulator circuit for controlling the second phase PHASE 2. The second modulator circuit in FIG. 8 provides PWM switching control signals HO2 and LO2 to control high and low side switches of a second converter stage (not shown), where the switches of the converter stages can be configured as buck converters stages, boost converter stages, or other suitable topologies in various embodiments.

In the PWM controller 106 of FIG. 8, a single adaptive compensation circuit 128 is used for controlling a compensation ramp signal for each of two stages or phases, with the second modulator circuitry including a second error amplifier 120b comparing the reference voltage VREF and the feedback signal FB to provide a corresponding error signal output ERROR as described above. A second summation circuit 126b receives a second current sense signal CS2 representing current flowing in the second stage of the DC to DC converter from a sense amplifier 124b based on sense signals from terminals 108b and 110b. The summation circuit 126b includes a second input receiving a second slope compensation ramp signal RAMP2 from the adaptive compensation circuit 128. The output of the summation circuit 126b provides a second compensated current sense signal COMP2 to a second PWM comparator 122b for comparison with the ERROR signal from the feedback comparator 120b. The output of the second PWM comparator 122b drives the reset ("R") input of a second PWM latch 130b whose set ("S") input receives the phase shifted clock signal CLKP from the phase shift circuit 119 to provide a latch output to a second switching control circuit 132b. The switching control circuit 132b drives the second set of high and low drivers switching control signals HO2 and LO2 via controller terminals 112b and 114b, respectively, as shown.

As seen in FIG. 9, the adaptive compensation circuit 128 in the illustrated multi-phase PWM controller 106 includes a PLL 136 providing a voltage control output signal VCTRL via connection 137, and the PLL 136 includes a voltage controlled oscillator (VCO) 144 providing the feedback clock signal FB CLK to the phase/frequency detector 138 as described above. In addition, the compensation circuit 128 includes first and second slope generator circuits 134 and 134b providing the RAMP and RAMP2 signals via lines 129a and 129b, respectively. Both slope generator circuits 134, 134b operate based on the shared voltage control signal VCTRL from the PLL 136, whereby the ramp outputs on lines 129a and 129b are of substantially identical shape and ramp height. However, the first slope generator circuit 134 uses the feedback clock FB CLK from the VCO 144 (or alternatively may operate based on the received clock CLK from line 135), whereas the second slope generator circuit 134b uses the phase shifted clock signal CLKP via line 135p. Because the clock signals used by the two slope generator circuits 134 and 134b are phase shifted relative to one another (e.g., by 180° in one example), the ramp outputs all RAMP and RAMP2 will likewise be phase shifted relative to one another by the same shift angle (e.g.,) 180°. In one possible implementation, a 180° clock phase shift can be achieved using an inverter as the phase shift circuit 119.

The PWM controller 106 in FIGS. 8 and 9 can thus provide two phases of a multi-phase DC to DC converter by driving both the HO1 and LO1 outputs for one phase and the HO2 and LO2 outputs for the second phase with substantially identical slope compensation waveforms phase shifted by an appropriate amount. In practice, the dual phase PWM controller embodiment 106 can be configured as a master or as a slave, and can be configured within a larger multi-phase system to provide a command clock output or to receive sync pulses to coordinate additional PWM controller integrated circuits so as to provide 3, 4, 6, 8 or "N" phases via suitable phase shifting circuitry in the controller 106. In this regard, the shared adaptive compensation circuit 128 may include the phase shift circuit 119 in certain embodiments. Multi-phase DC to DC converter systems facilitate reduced ripple and generally smoother switching waveforms and higher output currents than single-phase systems. In a non-limiting 4-phase system embodiment, for example, one master clock would be generated with four sub-clocks 90 degrees out of phase relative to one another. The shared PLL 136 advantageously provides for uniformity and similarity in the phase-shifted slope compensation ramp waveforms with frequency dependent amplitudes (e.g., linear or non-linear as described above), with any suitable clock phase-shifting circuitry being used to synchronize and phase shift the corresponding slope generator circuits 134. By sharing a common VCTRL or other PLL output control signal between matched pairs of slope generators 134, the need for individually matched adjustment resistors (or capacitors) by external means is mitigated or avoided.

The above examples are merely illustrative of several possible embodiments of various aspects of the present disclosure, wherein equivalent alterations and/or modifications will occur to others skilled in the art upon reading and understanding this specification and the annexed drawings. In addition, although a particular feature of the disclosure may have been disclosed with respect to only one of multiple implementations, such feature may be combined with one or more other features of other embodiments as may be desired and advantageous for any given or particular application. Also, to the extent that the terms "including", "includes", "having", "has", "with", or variants thereof are used in the detailed description and/or in the claims, such terms are intended to be inclusive in a manner similar to the term "comprising".

What is claimed is:

1. A controller for controlling a DC to DC converter, comprising:
a modulator circuit operative to provide at least one pulse width modulated switching control signal at least partially according to a clock signal in a plurality of converter switching cycles to selectively activate and deactivate at least one converter switching device to control an output voltage of the DC to DC converter;
an error amplifier circuit including a first input operative to receive a reference signal representing a desired output voltage for the DC to DC converter, a second input operative to receive a feedback signal representing the output voltage of the DC to DC converter, and an error amplifier output operative to provide an error signal based on a comparison of the reference signal with the feedback signal;
a summation circuit including a first input operative to receive a current sense signal representing a current flowing in the DC to DC converter, a second input operative to receive a slope compensation ramp signal, and an output operative to provide a compensated current sense signal based on a summation of the current sense signal and the slope compensation ramp signal; and
a compensation circuit, comprising:
a phase locked loop (PLL) including a clock input receiving the clock signal, the PLL operative to provide a control output signal having an amplitude generally proportional to a frequency of the clock signal, and
a slope generator circuit including a first input coupled to receive the control output signal from the PLL, a second input coupled to receive a reset signal, and a slope generator output coupled with the second input of the summation circuit, the slope generator circuit operative to provide the slope compensation ramp signal at the slope generator output having a repeating ramp waveform with an amplitude varying at least partially according to the amplitude of the control output signal from the PLL.

2. The controller of claim 1, wherein the slope generator circuit comprises:
a current source circuit coupled with the PLL to receive the control output signal and operative to provide a bias current signal with an amplitude generally proportional to the control output signal;
a current mirror circuit coupled with the current source circuit and operative to provide a mirror output current signal generally proportional to the bias current signal; and
a ramp circuit, including:
a ramp circuit capacitance with a first terminal coupled with the current mirror circuit to receive the mirror output current signal, and a second terminal coupled to a constant voltage node, and
a transistor coupled in parallel with the ramp circuit capacitance and operative according to the reset signal to selectively discharge the ramp circuit capacitance at a beginning or end of individual converter switching cycles;
wherein the slope generator circuit is operative to provide the slope compensation ramp signal at the slope generator output at least partially according to the voltage across the ramp circuit capacitance.

3. The controller of claim 2, wherein the PLL comprises:
a phase frequency detector with a first input receiving the clock signal, a second input receiving a feedback clock signal, and an output providing first and second phase frequency detector output signals according to a phase comparison of the clock signal with the feedback clock signal;
a charge pump circuit coupled with the phase frequency detector and operative to provide a charge pump output current signal according to the first and second phase frequency detector output signals; and
a filter circuit coupled with the charge pump circuit and operative to provide the control output signal at least partially according to the charge pump output current signal.

4. The controller of claim 2, wherein the slope generator circuit is operative to provide the slope compensation ramp signal having a linear ramp waveform.

5. The controller of claim 4, wherein the slope generator circuit comprises a voltage to current circuit coupled with the first terminal of the ramp circuit capacitance and wherein the slope generator circuit is operative to provide the slope compensation ramp signal as a current signal according to the voltage across the ramp circuit capacitance.

6. The controller of claim 2, wherein the slope generator circuit is operative to provide the slope compensation ramp signal having a non-linear ramp waveform.

7. The controller of claim 6, wherein the slope generator circuit comprises:
   a voltage to current circuit coupled with the first terminal of the ramp circuit capacitance and operative to provide a slope current signal according to the voltage across the ramp circuit capacitance; and
   a second ramp circuit, including:
      a second ramp circuit capacitance with a first terminal coupled with the voltage to current circuit to receive the slope current signal, and a second terminal coupled to the constant voltage node, and
      a second transistor coupled in parallel with the second ramp circuit capacitance and operative according to the reset signal to selectively discharge the second ramp circuit capacitance at the beginning or end of the individual converter switching cycles;
   wherein the slope generator circuit is operative to provide the slope compensation ramp signal at the slope generator output at least partially according to the voltage across the second ramp circuit capacitance.

8. The controller of claim 7, wherein the slope generator circuit comprises a second voltage to current circuit coupled with the first terminal of the second ramp circuit capacitance and wherein the slope generator circuit is operative to provide the slope compensation ramp signal as a current signal according to the voltage across the second ramp circuit capacitance.

9. The controller of claim 2, wherein the slope generator circuit comprises a voltage to current circuit coupled with the first terminal of the ramp circuit capacitance and wherein the slope generator circuit is operative to provide the slope compensation ramp signal as a current signal according to the voltage across the ramp circuit capacitance.

10. The controller of claim 9, wherein the control output signal controls a gain of the current source circuit, and wherein the control output signal controls a gain of the voltage to current circuit.

11. The controller of claim 2, wherein the current source circuit comprises:
   an op amp, comprising a first op amp input, a second op amp input, and an op amp output;
   a transistor, comprising a first terminal coupled with the current mirror circuit, a second terminal coupled with the second op amp input, and a control terminal coupled to receive a signal from the op amp output; and
   a resistor coupled between the second terminal of the transistor and the constant voltage node;
   wherein the current source circuit controls the amplitude of the bias current signal at least partially according to a voltage at the first op amp input and a resistance between the second terminal of the transistor and the constant voltage node.

12. The controller of claim 11, wherein the control output signal from the PLL is coupled with the first op amp input to control the amplitude of the bias current signal at least partially according to the amplitude of the control output signal.

13. The controller of claim 11, wherein the control output signal from the PLL controls the resistance between the second terminal of the transistor and the constant voltage node.

14. The controller of claim 13:
   wherein the current source circuit comprises a control transistor coupled in parallel with the resistor between the second terminal of the transistor and the constant voltage node; and
   wherein the control output signal from the PLL is coupled with a control terminal of the control transistor to control the resistance between the second terminal of the transistor and the constant voltage node.

15. The controller of claim 1, wherein the control output signal from the PLL is a voltage signal having a voltage amplitude generally proportional to the frequency of the clock signal.

16. The controller of claim 1, wherein the DC to DC converter is a multiphase converter having first and second converter stages, the controller comprising:
   a phase shift circuit receiving the clock signal and providing a phase shifted second clock signal having a non-zero phase shift relative to the clock signal;
   a second modulator circuit operative to provide at least one pulse width modulated second switching control signal at least partially according to the second clock signal in the plurality of converter switching cycles to selectively activate and deactivate at least one second converter switching device to control the output voltage of the DC to DC converter;
   a second error amplifier circuit including a first input operative to receive the reference signal, a second input operative to receive the feedback signal, and an error amplifier output operative to provide a second error signal based on a comparison of the reference signal with the feedback signal; and
   a second summation circuit including a first input operative to receive a second current sense signal representing a current flowing in the second stage of the DC to DC converter, a second input operative to receive a second slope compensation ramp signal, and an output operative to provide a second compensated current sense signal based on a summation of the second current sense signal and the second slope compensation ramp signal;
   wherein the compensation circuit comprises a second slope generator circuit including a first input coupled to receive the control output signal from the PLL, a second input coupled to receive the phase shifted second clock signal, and a second slope generator output coupled with the second input of the second summation circuit, the second slope generator circuit operative to provide the second slope compensation ramp signal at the second slope generator output having a repeating ramp waveform with an amplitude varying at least partially according to the amplitude of the control output signal from the PLL and a non-zero phase shift relative to the slope compensation ramp signal.

17. A DC to DC converter, comprising:
   a switching circuit comprising at least one converter switching device coupled with a switching node;
   an inductor with a first terminal coupled with the switching node;
   a modulator circuit operative to provide at least one pulse width modulated switching control signal at least partially according to a clock signal in a plurality of converter switching cycles to selectively activate and deactivate the at least one converter switching device to control an output voltage of the DC to DC converter;
   an error amplifier circuit including a first input operative to receive a reference signal representing a desired output voltage for the DC to DC converter, a second input operative to receive a feedback signal representing the output voltage of the DC to DC converter, and an error amplifier output operative to provide an error signal based on a comparison of the reference signal with the feedback signal;

a summation circuit including a first input operative to receive a current sense signal representing a current flowing in the DC to DC converter, a second input operative to receive a slope compensation ramp signal, and an output operative to provide a compensated current sense signal based on a summation of the current sense signal and the slope compensation ramp signal; and a compensation circuit, comprising:
  a phase locked loop (PLL) including a clock input receiving the clock signal, the PLL operative to provide a control output signal having an amplitude generally proportional to a frequency of the clock signal, and
  a slope generator circuit including a first input coupled to receive the control output signal from the PLL, a second input coupled to receive a reset signal, and a slope generator output coupled with the second input of the summation circuit, the slope generator circuit operative to provide the slope compensation ramp signal at the slope generator output having a repeating ramp waveform with an amplitude varying at least partially according to the amplitude of the control output signal from the PLL.

18. The DC to DC converter of claim 17:
wherein the switching circuit comprises:
  a first transistor coupled between the switching node and a converter output node, and
  a second transistor coupled between the switching node and a constant voltage node;
wherein the inductor has a second terminal coupled with a converter input node to form a boost converter; and
wherein the modulator circuit is operative to provide pulse width modulated switching control signals to selectively activate and deactivate the first and second transistors in complementary fashion to control the output voltage at the converter output node.

19. The DC to DC converter of claim 17:
wherein the switching circuit comprises:
  a first transistor coupled between a converter output node and the switching node, and
  a second transistor coupled between the switching node and a constant voltage node;
wherein the inductor has a second terminal coupled with a converter output node to form a buck converter; and
wherein the modulator circuit is operative to provide pulse width modulated switching control signals to selectively activate and deactivate the first and second transistors in complementary fashion to control the output voltage at the converter output node.

20. An integrated circuit, comprising:
a modulator circuit operative to provide a pulse width modulation signal to control an output voltage of a DC to DC converter;
an error amplifier circuit operative to provide an error signal based on a comparison of a reference signal representing a desired output voltage for the DC to DC converter with a feedback signal representing the output voltage;
a summation circuit including a first input operative to receive a current sense signal representing a current flowing in the DC to DC converter, a second input operative to receive a slope compensation ramp signal, and an output operative to provide a compensated current sense signal based on a summation of the current sense signal and the slope compensation ramp signal; and
an adaptive compensation circuit, including a phase locked loop operative to provide a control output signal having an amplitude generally proportional to a frequency of a clock signal, and a slope generator circuit operative to provide the slope compensation ramp signal to the summation circuit with a repeating ramp waveform and an amplitude generally proportional to the amplitude of the control output signal.

* * * * *